April 3, 1962  E. G. COLLEN ET AL  3,027,797
SPACE NAVIGATION SEXTANT
Filed Feb. 23, 1961  3 Sheets-Sheet 2

EDWIN G. COLLEN
ROBERT V. WAGONER,
INVENTORS

BY
ATTORNEYS

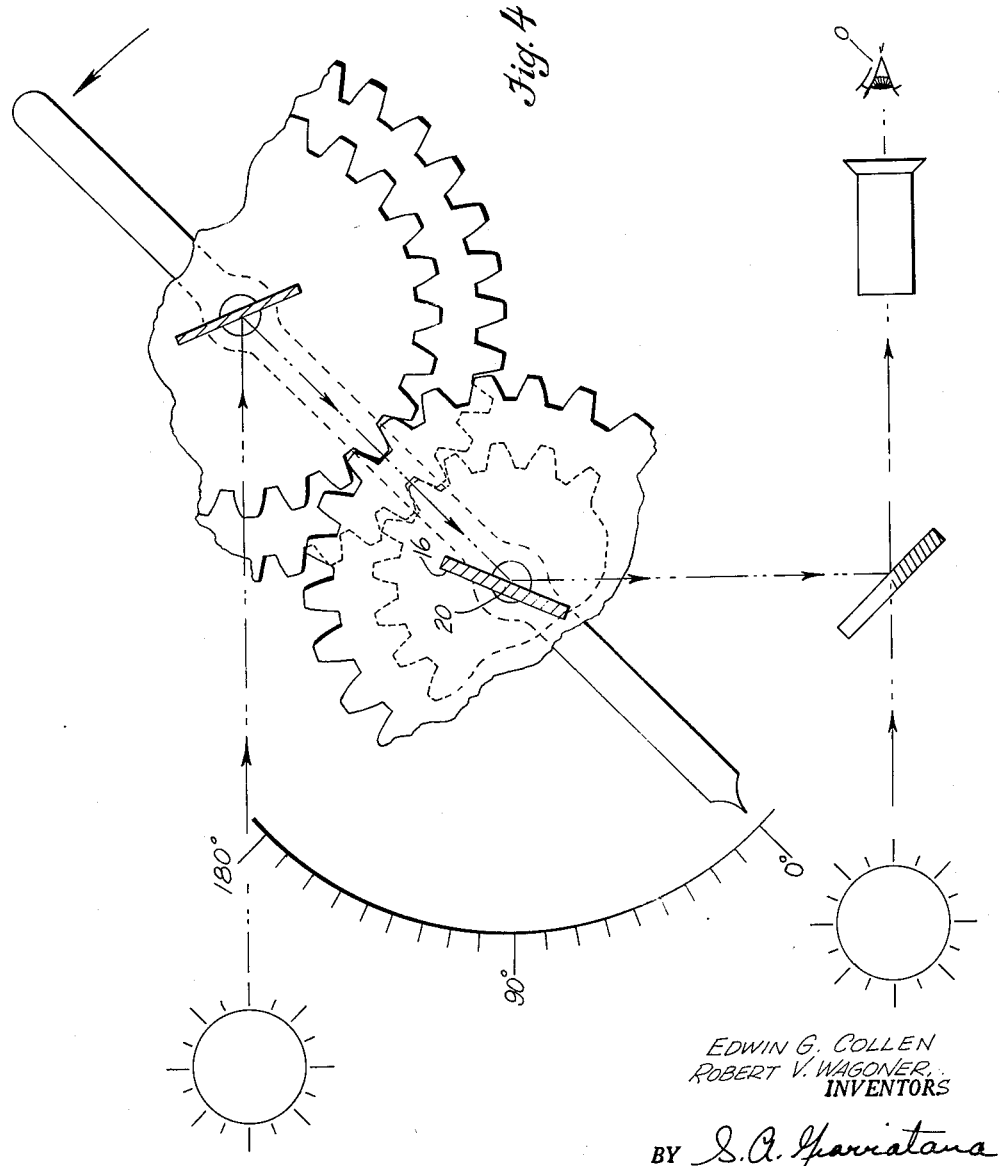

3,027,797
SPACE NAVIGATION SEXTANT
Edwin G. Collen, Morris Plains, and Robert V. Wagoner, West Englewood, N.J., assignors to General Precision Inc., Little Falls, N.J., a corporation of Delaware
Filed Feb. 23, 1961, Ser. No. 91,126
4 Claims. (Cl. 88—2.4)

The present invention relates to a sextant and more particularly to a sextant useful in space naviagation.

The sextant is an instrument used to measure angles between objects. Usually the angle measured is between a celestial body such as the sun and the horizon. The usual sextant utilizes two mirrors one of which is called the index glass and the other the horizon glass. These mirrors are supported perpendicular to the plane of the sextant on a frame to which a telescope and scale are attached. The horizon glass is a fixed piece and has one half of its surface unsilvered. The telescope points at the horizon glass so that an observer looking through the telescope eyepiece can see the horizon without reflection through the unsilvered portion of the mirror. The index glass is mounted on a pivoted movable arm and has associated therewith a graduated vernier scale to permit the angular position of the index glass to be read. If the movable arm is so positioned that the index glass and the horizon glass are parallel, and the observer sights the horizon, the two images will blend in the horizon glass and the observer sees only one horizon line. The scale reading for this setting is zero. When viewing or "shooting" the sun at an angle $\theta$ above the horizon, the index glass and its corresponding arm has to be turned through an angle of $\theta/2$ degrees so that the rays from the sun will be reflected into the horizon glass and then into the telescope. The observer then sees the sun superimposed upon the horizon. This is called "bringing the sun down on the horizon." Since the arm is turned through only one half the angle between the horizon and the sun, the scale is so calibrated that the angular reading is doubled; that is one-half degree on the scale is marked as one degree. The maximum full scale on a sextant runs from 0° to 150° and occupies an arc 75° in magnitude. This arrangement permits direct reading of the angle without having to multiply the angle indicated by two.

When navigating in space above the earth, the sextant just described has only a limited use since it is only theoretically possible to read angles up to 150°. In practice, the maximum angle read is usually 90° or less. Out in space, the navigator finds as many occasions to read angles of 90° to 180° between key celestial objects as he does to read angles below 90°. Thus, it may be necessary to read the angle between the space vehicle and opposed horizons, or between the sun and a known star. Although attempts may have been made to provide a sextant capable of supplying angles between two objects about 180° apart, none, as far as we are aware, have ever been successful when carried out in actual practice.

It has now been discovered that it is possible to provide a sextant capable of furnishing angles from 0° to 180°.

Thus, it is an object of the present invention to provide a sextant useful in space navigation.

A further object of the present invention is to provide a sextant capable of measuring angles of between 0° and 180°.

With the foregoing and other objects in view, the invention resides in the novel arrangement and combination of components and in the details of construction hereinafter described, it being understood that changes in the precise embodiment of the invention herein disclosed may be made within the scope of what is described without departing from the spirit of the invention.

Generally speaking, the present invention contemplates a sextant frame defining a plane; a telescope mounted in said plane; a horizon glass fixed in said frame in a plane perpendicular to said defined plane, having part of its surface transparent or unsilvered, disposed along the line of sight of said telescope at an angle to said line so that a first object can be viewed through said telescope and the unsilvered portion of said horizon glass; a pivotly rotatable intermediate mirror similarly disposed in said perpendicular plane at a distance from said horizon glass including a pivotpoint thereof; a lever arm of a lever of the second class movable in said defined plane whose fulcrum lies on said intermediate mirror pivotpoint; an index glass in said perpendicular plane as a load on said lever arm; and, a speed-change mechanism, e.g., gearing between said index glass and said intermediate mirror so that the pivoting of said lever arm about its fulcrum will maintain said intermediate mirror so angularly disposed with respect to said index glass and said horizon glass that light rays of a second object sighted by said index glass will pass via said intermediate mirror to said horizon glass where said rays are reflected into said telescope. Suitable reading means calibrated in desired angular units provide the angle between the lever arm and the telescope.

The advantages of the invention will become apparent from the following description taken in conjunction with the accompanying drawing in which.

Figure 1:
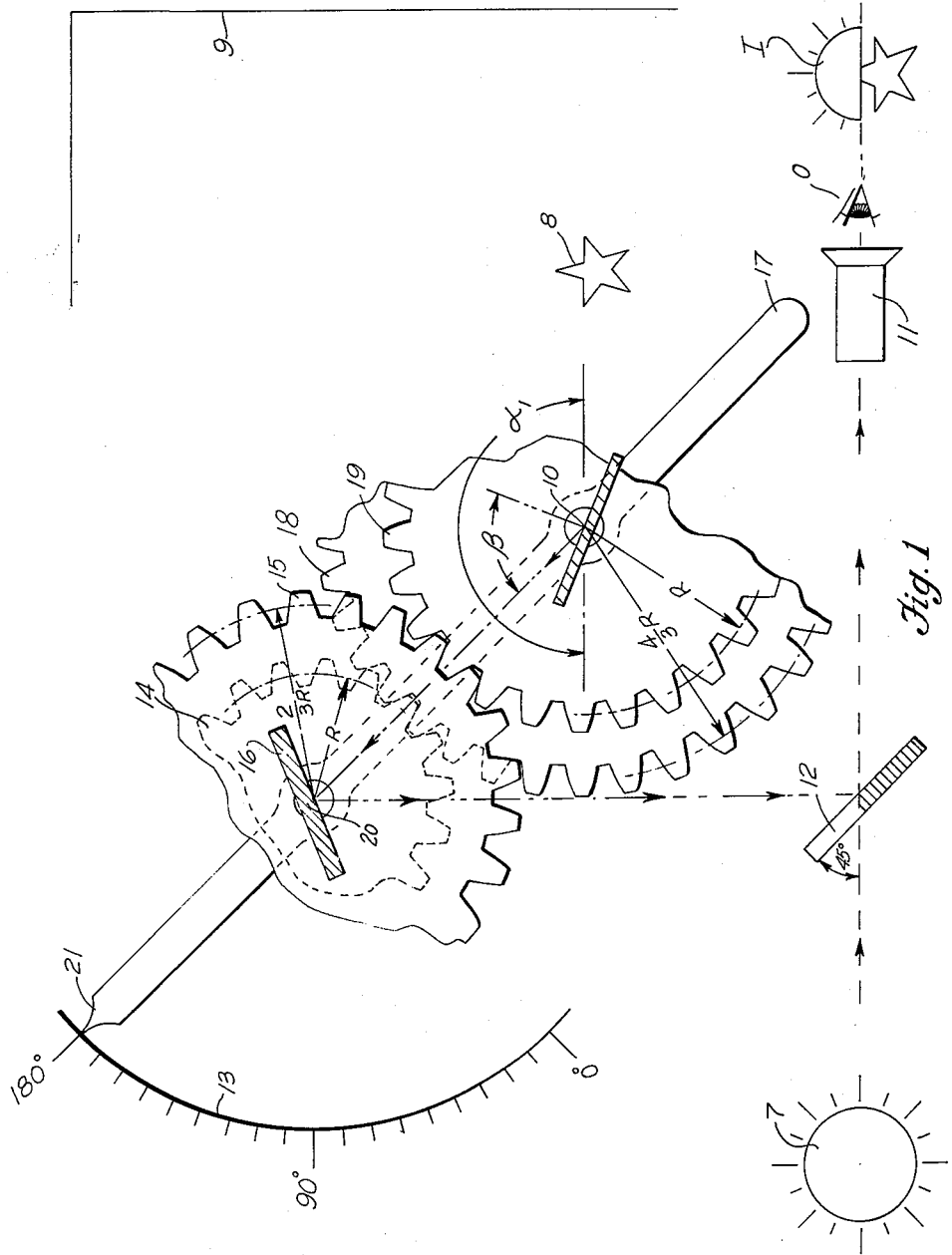
FIG. 1 is a longitudinal view of the device herein contemplated at the 180° position.
Figure 2:
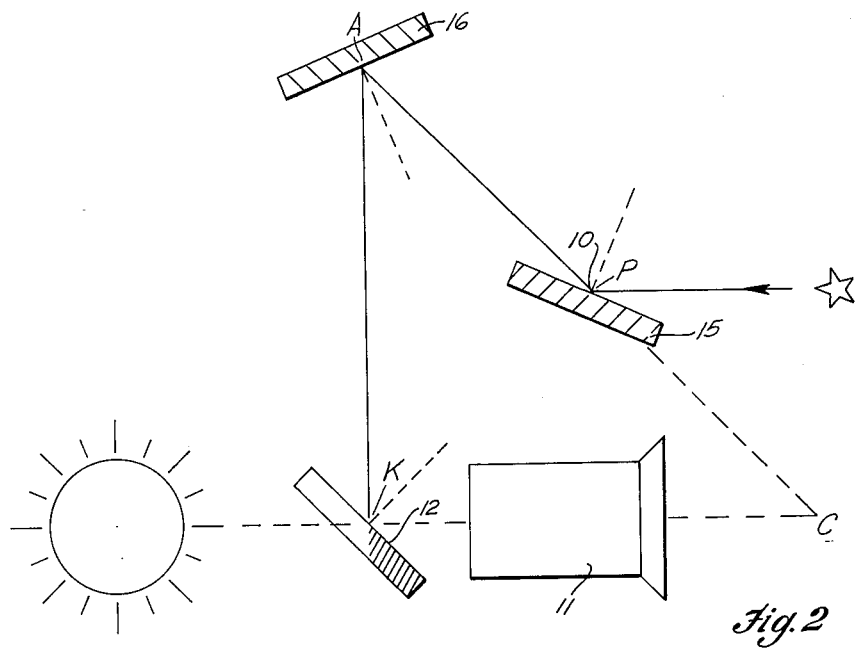
FIG. 2 illustrates some of the mathematical problems associated with the view shown in FIG. 1.
Figure 3:
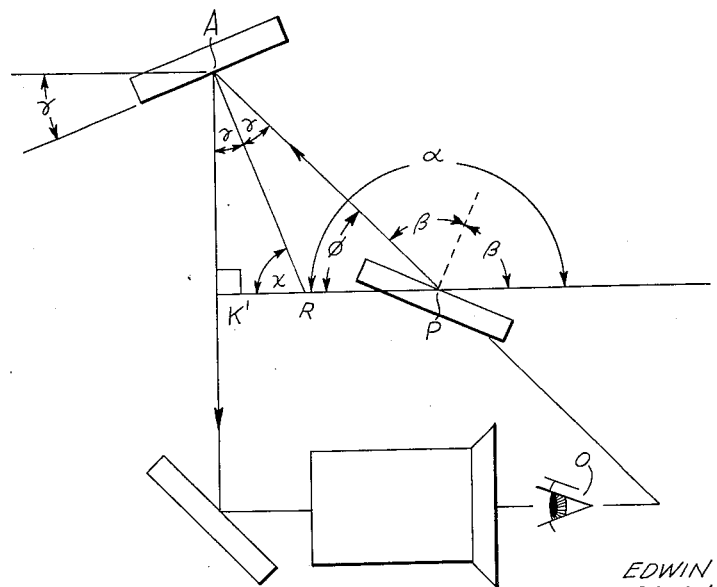

FIG. 3 provides the basis of the geometric solution of the problems illustrated in FIGS. 1 and 2; and FIG. 4 is a view similar to FIG. 1, but showing the device herein contemplated moved from the 180° position to the 0° position.

Shown in the drawing are the sun 7 and a star 8. In FIG. 1, the star is at an angle of 180° to the sun with respect to the eye of observer O who is using the sextant herein contemplated. Mounted on frame 9 is index glass 10 reflecting the image of star 8 into telescope 11 via horizon glass 12. The horizon glass is the usual half-silvered horizon glass so that observer O sees the image of star 8 in the silvered portion of horizon glass 12 and the sun 7 through the unsilvered portion. As shown in FIG. 1, the horizon glass is disposed at an angle of 45° to the telescope optical line of sight. The image I seen by the observer is that of the star superimposed on one half of the sun. To reflect the rays of star 8 into telescope 11, gears 14 and 15 associated with intermediate mirror 16 cooperate with gears 18 and 19 associated with index glass 10 to maintain intermediate mirror 16 at the proper angle with respect to the index glass 10. Index glass 10 is mounted on the arm of a lever of the second class 17. The fulcrum 20 of lever arm 17 lies on the pivotpoint or centerpoint about which intermediate mirror 16 rotates. Lever arm 17 has a pointer 21 running along a scale 13 so graduated as to be readable directly in degrees. This indicates the angle set between the objects viewed. Index glass 10, first index gear 18 and second index gear 19 form a gang assembly all rotatable together by the action of lever arm 17, the pivotpoint or centerpoint of index glass 10 coinciding with the centers of gears 18 and 19. Intermediate mirror 16 and gears 14 and 15 also form an assembly but not a gang assembly. Gear 14 is a fixed gear which does not rotate. Fixed gear 14 engages first index gear 18. Intermediate gear 15 rotates about fulcrum 20 and engages second index gear 19. Intermediate mirror 16 is rotated about fulcrum 20 by intermediate gear 15 to which it is attached. The pivotpoint of intermediate mirror 16, intermediate gear 15 and fixed gear 14 all coincide.

Gears 14, 15, 18 and 19 have a predetermined size relationship for reasons hereafter explained. Taking the radius of gears 15 and 19 as the basic unit, both these gears have a radius R. Fixed gear 14 has a radius of two-thirds R and first index gear 18 has a radius twice that of fixed gear 14 or four-thirds R.

In operation, the lever arm 17 is moved until the second celestial body image is brought down on the first celestial body image which has come through the unsilvered portion of the horizon glass 12 and is seen along the line of sight of telescope 11. As the arm sweeps an arc of 90°, it also traverses 90° on the fixed gear 14. This gear engages first index gear 18, but the radius and thus the circumference of first index gear 18 is twice the radius of fixed gear 14. The angular travel associated with a 90° arc on the smaller fixed gear 14 corresponds to only a 45° arc on the larger first index gear 18. Thus, first index gear 18 turns through 45° and, in so doing rotates second index gear 19 of radius R which is slaved to it, through the same 45° angle. Gear 15 on which the intermediate mirror 16 is mounted is then turned by gear 19, and, due to the one to one relationship between these two gears, gear 15 also rotates 45° as does intermediate mirror 16 slaved to it.

In order to understand the rotary motion of the index glass 10, it is necessary to imagine that there are no gears at all. Thus, as lever arm 17 is swept 90°, the index glass 10, without the action of gears would also change 90° from its original orientation. Now, however, due to the gang gear arrangement 18, 19 with index glass 10, there is an added 45° rotation brought into the picture. As a result, the index glass 10 moves through 135° while the intermediate mirror 16 rotates only 45°.

In working out the movement of the three mirrors mathematically, the condition for measuring 180° may be taken as the starting point. It must be remembered that the horizon glass 12, for the purpose of the present explanation is set at a 45° angle to the telescope line of sight. Under these circumstances, the light ray from the intermediate mirror 16 is always perpendicular to the line of sight. If the scale arc were to be increased or decreased or the angle of the horizon glass 12 changed, this relationship would no longer hold. The situation at 180° is chosen as the starting point since it makes possible more concrete visualization and hence simpler calculations. This is so because the lever arm, the telescope line of sight, and the ray of incidence into the horizon glass form the basis of a 45° right triangle. This may best be understood by reference to FIG. 2 where P is the centerpoint of index glass 10, A the centerpoint of intermediate mirror 16, K the centerpoint of the horizon glass, line KO is the line of sight, and the intersection of the line of sight and an extension of the lever arm is point C. Thus, by connecting and extending rays reflected by the three mirrors at 180° there is formed a 45° right triangle AKC. To simplify the explanation in terms of plane geometry, the triangle of FIG. 2 has been rearranged as a similar triangle in FIG. 3. The relationship of the mirrors can be expressed mathematically from FIG. 3. Looking now at FIG. 3, and reducing the relationships to plane geometry—

$\alpha$ is the angle to be measured between two celestial bodies and in figure is 180°.

$\beta$ is the angle of incidence or reflection of the index gases.

$\phi$ is the angle of the lever arm to the line of sight.

$\gamma$ is the angle of incidence or reflection of the intermediate mirror.

Triangle AK'P is a triangle similar to triangle AKC of FIGURE 2, line K'P being a line parallel to line of sight KO or KC but through index gases centerpoint P.

Triangle AK'R is formed by line K'P parallel to line of sight KC and the two lines forming the angle of incidence from intermediate mirror 16.

Looking now at FIGURE 3, (1) $\quad \alpha = 180° - \phi + 2\beta$ (2) $\quad 90° = \phi + 2\gamma$ therefore (3) $\quad \alpha = 90° - 2\gamma + 2\beta$ From triangle ARP (4) $\quad \gamma + \phi + (180° - X) = 180°$ From triangle AK'R (5) $\quad X = 90° - \gamma$ Substituting (1) and (5) in (4)

$\gamma + (180° - 2\beta) + 180° - (90° - \gamma) = 180°$
$\gamma + 180° - 2\beta + 180° - 90° + \gamma = 180°$
$2\gamma - 2\beta = 180° - 180° - 180° + 90°$
$2\gamma - 2\beta = -90°$ (6) $\quad \beta - \gamma = 45°$ The foregoing relationship of Equation 6 will hold true for any angle between the observer and the celestial bodies sighted.

In practice, variables may be introduced at many points but the fundamental concept herein illustrated will remain the same and the relationship of the various mirrors may be derived mathematically in a manner similar to that herein described. The horizon glass position can be varied with respect to the line of sight, also the lever arm can be made to traverse a different arc, thus changing the scale. To accomplish the latter aim, the gear ratios may be changed. With the present arrangement, a four to one relationship is obtained in that a 45° revolution of gear 15 produces a coverage of 180° and, likewise, a 180° scale change. By varying the gear ratios, e.g., by increasing the one to one relationship between gears 15 and 18, it is also possible to achieve a greater than 180° sweep. Again by varying the gear ratios, multiplication of greater than four to one can be realized.

It is to be observed therefore that the present invention provides for a sextant, comprising in combination, a sextant frame 9 defining a plane; a telescope 11 mounted in said plane; a horizon glass 12 fixed in said frame 9, in a plane perpendicular to said defined plane having one-half of its surface transparent or unsilvered, disposed along the line of sight of said telescope 11 at an angle of 45° to said line so that a first object 7 can be viewed through said telescope and the transparent portion of said horizon glass; a pivotly rotatable intermediate mirror 16 similarly disposed in said perpendicular plane at a distance from said horizon glass including a pivotpoint thereof; a lever arm 17 of a lever of the second class movable in said defined plane whose fulcrum 20 lies on said intermediate mirror pivotpoint; an index glass 10 in said perpendicular plane as a load on said lever arm 17; and, a speed-change mechanism, e.g., gearing 14, 15, 18, and 19, between said gearing or speed-change being such that the pivoting of said lever arm 17 about its fulcrum 20 will rotate said intermediate mirror 45° for 135° rotation of said index glass, said gearing or speed-change mechanism maintaining said intermediate mirror 16 so positioned that when light rays of a second object are sighted by said index glass 10 which second object 8 is at an angle of 180° to said first object 7 with respect to an observed 0 looking into said telescope 11, said second object light rays will pass via said intermediate mirror 16 to said horizon glass 12 where said rays are reflected into said telescope 17. The gearing contemplated herein includes a fixed gear 14 whose center lies on said intermediate mirror pivotpoint; a first index gear 18, the index glass being attached thereto as part of a gang assembly, the center of said index gear 18 lying on said index glass pivotpoint, said first index gear 18 being engaged by said fixed gear; a second index gear 19 as part of said gang assembly attached to said first index gear and said index glass; and, an intermediate gear 15 engaged by said second index gear 19, said intermediate gear center lying on said intermediate mirror pivotpoint, said intermediate mirror being attached thereto. The ratio of said gear radii, with R as the radius unit may be expressed as:

Intermediate gear 15, R
Second index gear 19, R
Fixed gear 14, two-thirds R
First index gear 18, four-thirds R Furthermore, in describing the present invention herein, even though the present device is intended for a vehicle of the space age, certain archaic navigational terminology is used, as the language of the art. Thus, the terms "horizon glass" and "index glass" are used although these components should more properly be called mirrors, and the "horizon glass" in space will probably be used for viewing a celestial body rather than the horizon. The expression "bringing the sun down on the horizon" appears to have been carried into air navigational language and is therefore used herein in the same sense, i.e., making the two celestial bodies coincide or be superimposed one on the other when viewed by the observer through the telescope.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. A sextant, comprising in combination, a sextant frame defining a plane; a telescope mounted in said plane; a horizon glass fixed in said frame in a plane perpendicular to said defined plane, having one half of its surface transparent, disposed along the line of sight of said telescope at an angle of 45° to said line so that a first object can be viewed through said telescope and the transparent portion of said horizon glass; a pivotly rotatable intermediate mirror similarly disposed in said perpendicular plane at a distance from said horizon glass including a pivotpoint thereof; a lever arm of a lever of the second class movable in said defined plane whose fulcrum lies on said intermediate mirror pivotpoint; an index glass in said perpendicular plane as a load on said lever arm; and, gearing between said index glass and said intermediate mirror, the gear ratio of said gearing being such that the pivoting of said lever arm about its fulcrum will rotate said intermediate mirror 45° for a 135° rotation of said index glass, said gearing maintaining said intermediate mirror so positioned that when light rays of a second object are sighted by said index glass which second object is at an angle of 180° to said first object with respect to an observer looking into said telescope, said second object light rays will pass via said intermediate mirror to said horizon glass where said rays are reflected into said telescope.

2. A device as claimed in claim 1, said gearing including a fixed gear whose center lies on said intermediate mirror pivotpoint; a pivotpoint for said index glass; a first index gear, said index glass being attached thereto as part of a gang assembly, the center of said first index gear lying on said index glass pivotpoint, said first index gear being engaged by said fixed gear; a second index gear as part of said gang assembly attached to said first index gear and said index glass; and, an intermediate gear engaged by said second index gear, said intermediate gear center lying on said intermediate mirror pivotpoint, said intermediate mirror being attached thereto.

3. A device as claimed in claim 2, wherein the ratio of said gear radii with R as the radius unit is Intermediate gear, R
second index gear, R
fixed gear, two-thirds R
First index gear, four-thirds R.

4. A device as claimed in claim 1 including a scale calibrated to read in desired units arcuately disposed on said frame opopsite said lever arm, and a pointer associated with said lever arm so as to run along said scale.

References Cited in the file of this patent

UNITED STATES PATENTS

| | | |
|---|---|---|
| 1,697,293 | Sperry | Jan. 1, 1929 |
| 2,589,363 | Foufounis | Mar. 18, 1952 |

FOREIGN PATENTS

| | | |
|---|---|---|
| 271,706 | Germany | Mar. 17, 1914 |
| 473,539 | Great Britain | Oct. 15, 1937 |